(12) United States Patent
Hillis et al.

(10) Patent No.: US 8,072,439 B2
(45) Date of Patent: *Dec. 6, 2011

(54) TOUCH DETECTING INTERACTIVE DISPLAY

(75) Inventors: W. Daniel Hillis, Encino, CA (US);
Bran Ferren, Beverly Hills, CA (US)

(73) Assignee: Touchtable, Inc., Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/890,453

(22) Filed: Sep. 24, 2010

(65) Prior Publication Data

US 2011/0022991 A1 Jan. 27, 2011

Related U.S. Application Data

(63) Continuation of application No. 11/188,186, filed on Jul. 22, 2005, now Pat. No. 7,907,124, which is a continuation-in-part of application No. 10/913,105, filed on Aug. 6, 2004, now Pat. No. 7,728,821.

(51) Int. Cl.
*G06F 3/041* (2006.01)
(52) U.S. Cl. ...... 345/173; 345/175; 345/179; 178/18.01
(58) Field of Classification Search .......... 345/156–158, 345/173–179; 178/18.01–18.04
See application file for complete search history.

(56) References Cited

U.S. PATENT DOCUMENTS

| | | |
|---|---|---|
| 3,478,220 A | 11/1969 | Milroy |
| 3,673,327 A | 6/1972 | Johnson |
| 3,764,813 A | 10/1973 | Clement |
| 3,775,560 A | 11/1973 | Ebeling |
| 3,860,754 A | 1/1975 | Johnson |
| 4,144,449 A | 3/1979 | Funk |
| 4,245,634 A | 1/1981 | Albisser |

(Continued)

FOREIGN PATENT DOCUMENTS

EP 0881592 B2 10/2002

(Continued)

OTHER PUBLICATIONS

Wu, et al.; "Gesture Registration, Relaxation, and Reuse for Multi-Point Direct-Touch Surfaces"; Jan. 2006; Proceedings of IEEE International Workshop on Horizontal Interactive Human-Computer Systems (Table Top), Adelaide, South Australia; 8 pages.

(Continued)

*Primary Examiner* — Kimnhung Nguyen
(74) *Attorney, Agent, or Firm* — Michael A. Glenn; Glenn Patent Group

(57) ABSTRACT

The invention provides an interactive display that is controlled by user gestures identified on a touch detecting display surface. In the preferred embodiment of the invention, imagery is projected onto a horizontal projection surface from a projector located above the projection surface. The locations where a user contacts the projection surface are detected using a set of infrared emitters and receivers arrayed around the perimeter of the projection surface. For each contact location, a computer software application stores a history of contact position information and, from the position history, determines a velocity for each contact location. Based upon the position history and the velocity information, gestures are identified. The identified gestures are associated with display commands that are executed to update the displayed imagery accordingly. Thus, the invention enables users to control the display through direct physical interaction with the imagery.

15 Claims, 7 Drawing Sheets

U.S. PATENT DOCUMENTS

| | | | |
|---|---|---|---|
| 4,247,767 A | 1/1981 | O'Brien | |
| 4,463,380 A | 7/1984 | Hooks, Jr. | |
| 4,507,557 A | 3/1985 | Tsikos | |
| 4,517,559 A | 5/1985 | Deitch | |
| 4,527,240 A | 7/1985 | Kvitash | |
| 4,722,053 A | 1/1988 | Dubno | |
| 4,742,221 A | 5/1988 | Sasaki | |
| 4,746,770 A | 5/1988 | McAvinney | |
| 4,782,328 A | 11/1988 | Denlinger | |
| 5,105,186 A | 4/1992 | May | |
| 5,239,373 A | 8/1993 | Tang et al. | |
| 5,436,639 A | 7/1995 | Arai et al. | |
| 5,483,261 A | 1/1996 | Yasutake | |
| 5,512,826 A | 4/1996 | Hardy et al. | |
| 5,982,352 A | 11/1999 | Pryor | |
| 6,008,798 A | 12/1999 | Mato, Jr. | |
| 6,057,845 A | 5/2000 | Dupouy | |
| 6,141,000 A | 10/2000 | Martin | |
| 6,215,477 B1 | 4/2001 | Morrison | |
| 6,232,957 B1 | 5/2001 | Hinckley | |
| 6,333,753 B1 | 12/2001 | Hinckley | |
| 6,335,722 B1 | 1/2002 | Tani et al. | |
| 6,335,724 B1 | 1/2002 | Takekawa | |
| 6,337,681 B1 | 1/2002 | Martin | |
| 6,352,351 B1 | 3/2002 | Ogasahara | |
| 6,384,809 B1 | 5/2002 | Smith | |
| 6,414,671 B1 | 7/2002 | Gillespie | |
| 6,421,042 B1 | 7/2002 | Omura | |
| 6,429,856 B1 | 8/2002 | Omura | |
| 6,504,532 B1 | 1/2003 | Ogasahara | |
| 6,518,959 B1 | 2/2003 | Ito | |
| 6,531,999 B1 | 3/2003 | Trajkovic | |
| 6,532,006 B1 | 3/2003 | Takekawa | |
| 6,563,491 B1 | 5/2003 | Omura | |
| 6,594,023 B1 | 7/2003 | Omura | |
| 6,608,619 B2 | 8/2003 | Omura et al. | |
| 6,636,635 B2 | 10/2003 | Matsugu | |
| 6,654,007 B2 | 11/2003 | Ito | |
| 6,723,929 B2 | 4/2004 | Kent | |
| 6,747,636 B2 | 6/2004 | Martin | |
| 6,764,185 B1 | 7/2004 | Beardsley | |
| 6,765,558 B1 | 7/2004 | Dotson | |
| 6,788,297 B2 | 9/2004 | Itoh et al. | |
| 6,791,700 B2 | 9/2004 | Omura | |
| 6,803,906 B1 | 10/2004 | Morrison | |
| 6,810,351 B2 | 10/2004 | Katsurahira | |
| 6,825,890 B2 | 11/2004 | Matsufusa | |
| 6,828,959 B2 | 12/2004 | Takekawa | |
| 6,888,536 B2 | 5/2005 | Westerman | |
| 6,922,642 B2 | 7/2005 | Sullivan | |
| 6,999,061 B2 | 2/2006 | Hara et al. | |
| 7,339,580 B2 | 3/2008 | Westerman et al. | |
| 7,474,296 B2 | 1/2009 | Obermeyer et al. | |
| 7,728,821 B2 * | 6/2010 | Hillis et al. | 345/173 |
| 2001/0019325 A1 | 9/2001 | Takekawa | |
| 2001/0022579 A1 | 9/2001 | Hirabayashi | |
| 2001/0026268 A1 | 10/2001 | Itoh | |
| 2002/0036617 A1 | 3/2002 | Pryor | |
| 2002/0185981 A1 | 12/2002 | Dietz et al. | |
| 2003/0001825 A1 | 1/2003 | Omura et al. | |
| 2003/0063775 A1 | 4/2003 | Rafii et al. | |
| 2003/0137494 A1 | 7/2003 | Tulbert | |
| 2003/0231167 A1 | 12/2003 | Leung | |
| 2004/0046744 A1 | 3/2004 | Rafii et al. | |
| 2005/0052427 A1 | 3/2005 | Wu et al. | |
| 2006/0022955 A1 | 2/2006 | Kennedy | |
| 2006/0026521 A1 | 2/2006 | Hotelling et al. | |
| 2006/0026536 A1 | 2/2006 | Hotelling et al. | |
| 2007/0252821 A1 | 11/2007 | Hollemans et al. | |
| 2007/0268273 A1 | 11/2007 | Westerman et al. | |
| 2008/0211785 A1 | 9/2008 | Hotelling et al. | |

FOREIGN PATENT DOCUMENTS

| | | |
|---|---|---|
| EP | 0881591 B1 | 9/2003 |
| JP | 2001/175807 | 6/2001 |

OTHER PUBLICATIONS

Wu, Mike et al. Multi-Finger and Whole Hand Gestural Interaction Techniques for Multi-User Tabletop Displays; ACM CHI Letters, 5(2); 193-202. ACM UIST 2003 Symposium on User interface Software & Technology, Vancouver, Canada; Nov. 2003; pp. 193-202.

NCSA (National Center for Supercomputing Applications); GM Slab Function; Museum Consortium; Jul. 10, 2003; Johnson and Curtis Univ. Of Illinois.

Smart Board for Flat Panel Displays (interactive Overlay); Nov. 2003; Smart Technologies Inc.

Paradiso and Strickon; "The Laser Wall"; Sep. 1997; MIT Media Lab; http://web.media.mit.edu/~joep/SpectrumWeb/captions/Laser.html.

Rekimoto, Jun; "SmartSkin: An Infrastructure for Freehand Manipulation on Interactive Surfaces"; Apr. 2002; CHI 2002; Minnesota, USA;retrieved from website: http://www.csl.sony.co.jp/person/rekimoto/smartskin/.; Interaction Laboratory Sony Computer Science Laboratories, Inc.

NCSA (National Center for Supercomputing Applications) Overview; Mississippi RiverWeb Museum Consortium; Jun. 13, 2005; Johnson and Curtis Univ. Of Illinois.

Small, Charles H.: "Touchscreens Provide a Robust and Intuitive User Interface"; May 24, 2002; TechOnline; www.techonline.com/showArticle.jhtml?articleID=192200401&queryText=touch+screen.

Ryall, K. et al "Diamond Touch Applications" Mitsubishi Electric Research Laboratories; Aug. 2, 2004.

* cited by examiner

TOUCH DETECTING INTERACTIVE DISPLAY

CROSS-REFERENCE TO RELATED APPLICATIONS

This application is a continuation of the following earlier-filed application and claims the benefit thereof in accordance with 35 USC 120: U.S. patent application Ser. No. 11/188,186 entitled METHOD AND APPARATUS CONTINUING ACTION OF USER GESTURES PERFORMED UPON A TOUCH SENSITIVE INTERACTIVE DISPLAY IN SIMULATION OF INERTIA, which was filed on Jul. 22, 2005 in the names of W. Daniel Hillis and Bran Ferren. The '186 application is a continuation-in-part of the following earlier-filed application and claims the benefit thereof in accordance with 35 USC 120: U.S. patent application Ser. No. 10/913,105 entitled TOUCH DETECTING INTERACTIVE DISPLAY, which was filed on Aug. 6, 2004 in the names of W. Daniel Hillis, Bran Ferren, and Ryan McKinley. The '105 application issued as U.S. Pat. No. 7,728,821 B2 on Jun. 1, 2010. All of the foregoing materials are fully incorporated herein by reference.

TECHNICAL FIELD

The invention relates to interactive displays. More particularly, the invention relates to multi-user displays suitable for displaying geographical imagery.

DESCRIPTION OF THE PRIOR ART

There are many situations in which one or more individuals interactively explore image based data. For example, a team of paleontologists may wish to discuss an excavation plan for a remote dig site. To do so, they wish to explore in detail the geographic characteristics of the site as represented on digitized maps. In most laboratories, this requires the team either to huddle around a single workstation and view maps and images on a small display, or sit at separate workstations and converse by phone.

The activity of exploring imagery is much more easily and effectively accomplished with the users surrounding a single large display. While such displays do exist, the interface to the display is typically still operated by a single user. For example, the National Center for Supercomputing Applications (NCSA) and the Geographic Modeling Systems Laboratory have developed an interactive display for museum exhibits in which imagery is displayed on a large horizontal projection surface (http://archive.ncsa.uiuc.edu/Cyberia/RWConsort_UIUC/index.html). A nearby touch screen control console allows visitors to move through and investigate 3-D graphical representations" of the exhibited geographic region. However, as the adjacent touch screen console must still be operated by a single user, the ability of the team as a whole to interact meaningfully with the display is limited.

Moreover, the interfaces to most displays are not particularly intuitive. While the NCSA system does provide a convenient touch screen interface, it is disjoint from the display itself, distancing the controlling user from the display and lessening any sense of immersion within the imagery. Other displays do not offer even this level of convenience, requiring users to manipulate the imagery through the use of keyboards and pointing devices such as mice.

It would be advantageous to provide a collaborative display with which several users can meaningfully discuss and interact with imagery as a group. It would also be advantageous if such a display allowed the users to control the imagery and underlying information through direct interaction with the display itself, using a set of natural gestures. It would be further advantageous to provide a display that is useful for individuals exploring Geographic Information Systems (GIS) data, such as scientists and military planners.

SUMMARY

The invention provides an interactive display that is controlled by user gestures identified on a touch detecting display surface. In the preferred embodiment of the invention, imagery is projected onto a horizontal projection surface from a projector located above the projection surface. Locations where a user contacts the projection surface are detected using a set of infrared emitters and receivers arrayed around the perimeter of the projection surface. For each contact location, a computer software application stores a history of contact position information and, from the position history, determines a velocity for each contact location. Based upon the position history and the velocity information, gestures are identified. The identified gestures are associated with display commands that are executed to update the displayed imagery accordingly. Thus, the invention enables users to control the display through direct physical interaction with the imagery.

The contact locations may be detected by any of several approaches, including infrared emitters and receivers, a capacitive or resistive touch pad, ultrasound, and visual analysis of a material layer below the display surface that exhibits a visible change in response to applied pressure. Optionally, the position history and velocity information are supplemented with measurements of the intensity with which a user contacts the display surface.

In the preferred embodiment of the invention, gestures are identified and associated with commands by pairing each contact location with a pixel within the imagery and updating the imagery, such that each of the pixels remains coincident with the corresponding contact location. Alternatively, gestures are identified by classifying the position history and velocity information as one of several distinct, allowable gestures.

Commands that may be associated with the identified gestures include, for example, panning, zooming, and rotation. Objects represented within the imagery may be selected, and menus and submenus may be navigated. If the displayed imagery contains imagery layers, as in the case of geographical information systems imagery, the visibility and transparency of the layers may be adjusted. The displayed imagery preferably includes a control interface, such as a menu, positioned near and oriented towards a point on the edge of the display surface. At the request of a user, the control interface may be repositioned near and oriented towards another point on the edge of the display surface. Finally, the display surface is preferably surrounded by a railing that provides a visual cue that discourages users from leaning onto the display surface.

DETAILED DESCRIPTION OF A PREFERRED EMBODIMENT

The invention provides an interactive display that is controlled by user gestures identified on a touch detecting display surface.

Figure 1:
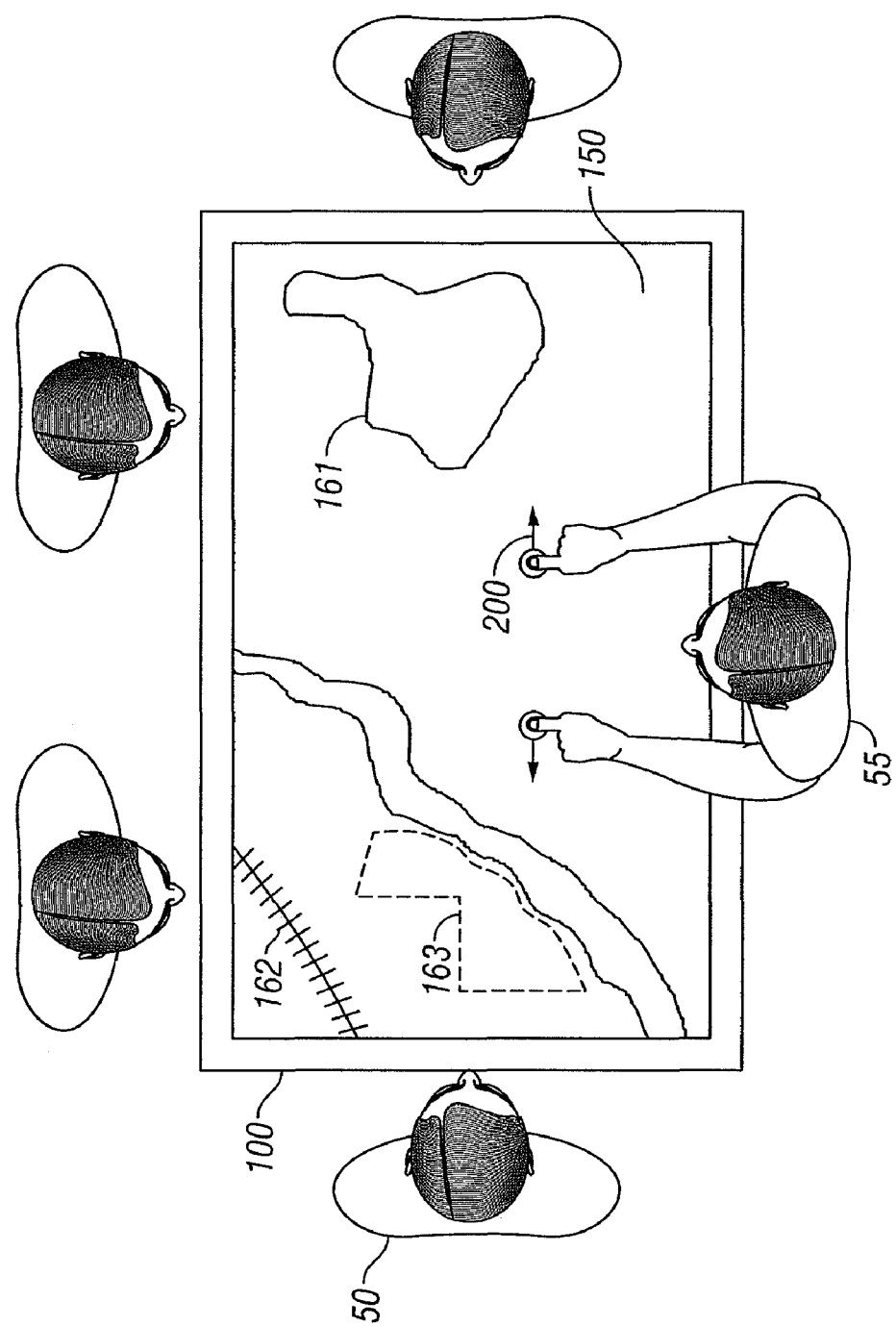
FIG. 1 shows several users operating an interactive, touch detecting display according to a preferred embodiment of the invention.

FIG. 1 shows several users operating an interactive, touch detecting display according to a preferred embodiment of the invention. The users 50 surround the display 100, such that each user can view the display surface 150, which shows imagery of interest to the users. For example, the display may present Geographic Information System (GIS) imagery characterized by geographic 161, economic 162, political 163, and other features, organized into one or more imagery layers. Because the users can comfortably surround and view the display, group discussion and interaction with the display is readily facilitated.

The display surface is capable of detecting when and where a user touches the display surface. Based upon this information, user gestures are identified, and a command associated with the user gesture is determined. The command is executed, altering the displayed imagery in the manner requested by the user via the gesture. For example, in FIG. 1, a user 55 gestures by placing his fingertips on the display surface and moving them in an outwardly separating manner. This particular gesture 200 is preferably associated with an inward zoom command. When the zoom command is executed, the display provides a closer, more detailed view of the displayed imagery.

Figure 2:
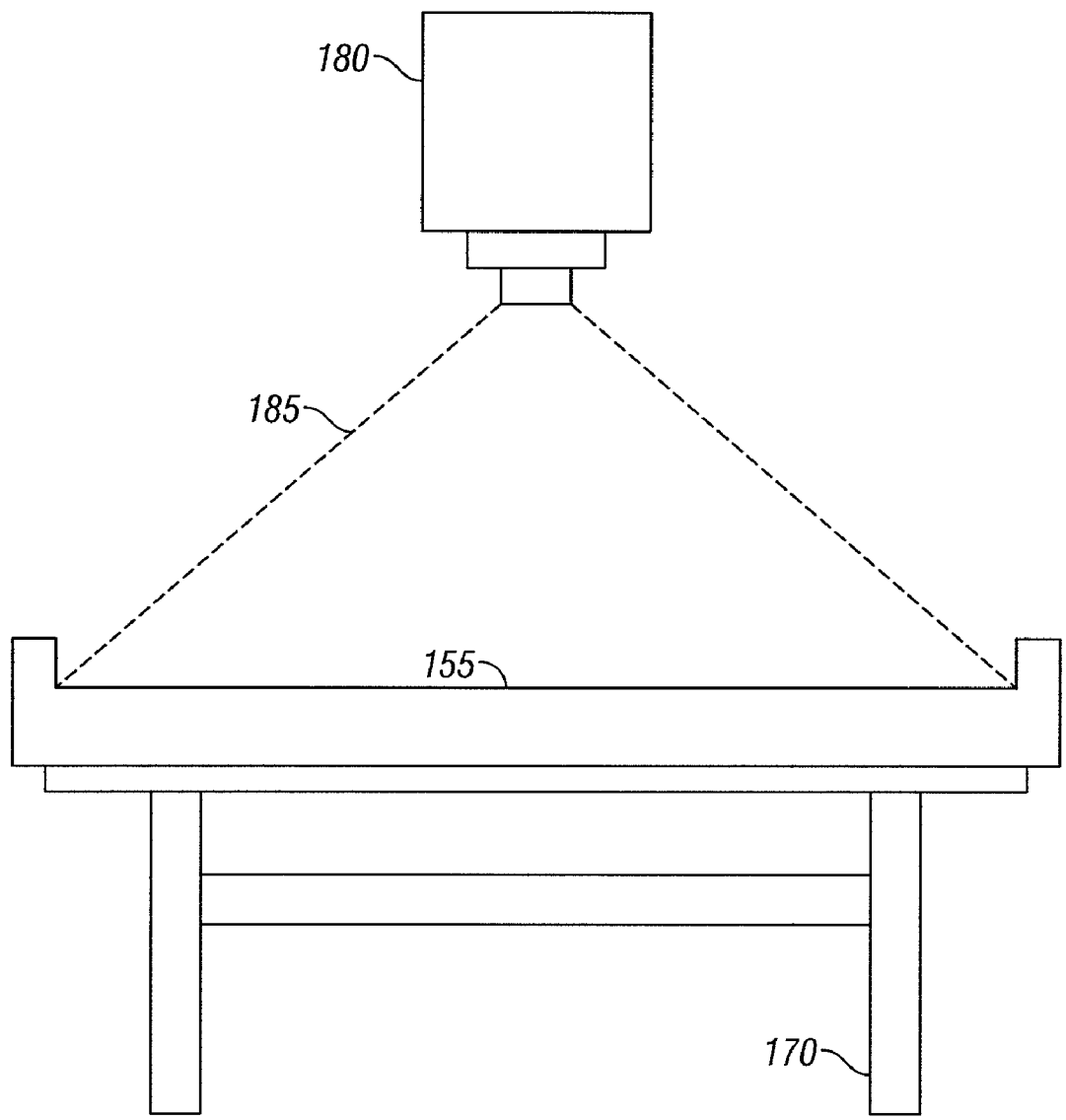
FIG. 2 shows a side view of an interactive, touch detecting, tabletop projection display according to a preferred embodiment of the invention.

FIG. 2 shows a side view of an interactive, touch detecting, tabletop projection display according to a preferred embodiment of the invention. The display surface is a horizontally oriented, planar projection surface 155 supported by a table-like structure 170. The table-like structure preferably supports the projection surface at waist level for adult users, allowing the users to view and touch the entirety of the projection surface comfortably. The displayed imagery is generated by a projector 180 located above and projecting 185 downward onto the projection surface.

While projection from above onto a horizontally oriented display is preferred, other display surface orientations, projector configurations, and display technologies are possible. For example, a horizontally oriented rear-projection surface may be used as the display surface, with the projector mounted below the display surface, projecting in an upward direction. This approach offers the advantage of eliminating the shadows generated in those configurations where a user may position his body between the projector and the projection surface. The display may also be mounted in a vertical orientation and affixed to a wall or other supporting structure. In this case, nonprojection, thin profile display technologies may be most appropriate, such as LCD's, OLED's, or plasma displays, although those skilled in the art will appreciate that any display technology may be used in connection with the invention herein.

Figure 3:
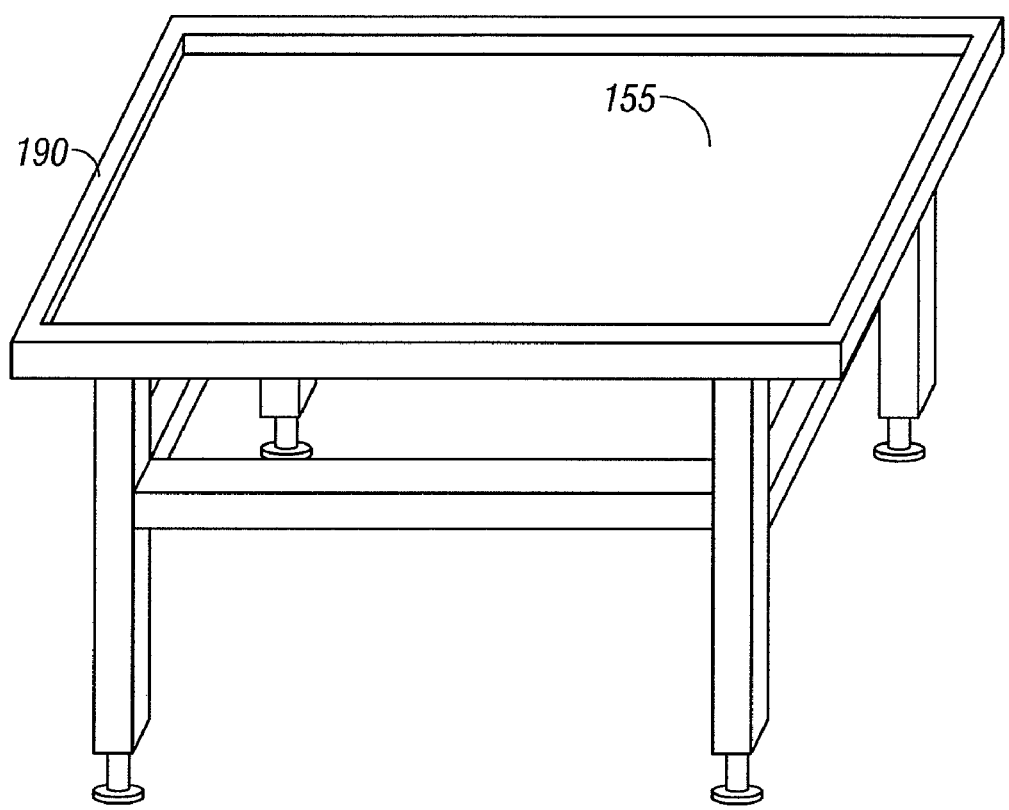
FIG. 3 shows a perspective view of an interactive, touch detecting, tabletop projection display according to the preferred embodiment of the invention.

FIG. 3 shows a perspective view of an interactive, touch detecting, tabletop projection display according to the preferred embodiment of the invention. A consequence of the preferred horizontal orientation of the display surface is a natural inclination of users to rest a hand on the projection surface for support, especially when leaning forward to point to objects near the center of the projection surface. Such contact with the display is potentially erroneously interpreted as a gesture. Accordingly, the projection surface 155 is preferably surrounded by a small railing 190. The railing provides a visual cue that discourages users from leaning onto the display, and also provides structural support should the a user wish to lean forward towards the center of the display.

Detection of when and where a user touches the display surface may be achieved by a number of different approaches. In the preferred embodiment of the invention, a set of infrared emitters and receivers is arrayed around the perimeter of the projection surface, oriented such that each emitter emits light in a plane a short distance above the projection surface. The location where the user is touching the projection surface is determined by considering which emitters are and are not occluded as viewed from each of the receivers. A configuration incorporating a substantially continuous set of emitters around the perimeter and three receivers, each positioned in a corner of the projection surface, is particularly effective in resolving multiple locations of contact.

Alternatively, a resistive touch pad, such as those commonly used in laptop computers, may be placed beneath a flexible display surface. The resistive touch pad comprises two layers of plastic that are separated by a compressible insulator such as air, and a voltage differential is maintained across the separated layers. When the upper layer is touched with sufficient pressure, it is deflected until it contacts the lower layer, changing the resistive characteristics of the upper to lower layer current pathway. By considering these changes in resistive characteristics, the location of the contact can be determined. Capacitive touch pads may also be used, such as the Synaptics TouchPad™ (www.synaptics.com/products/touchpad.cfm).

In yet another embodiment of the invention, a thin layer of material that changes optical properties in response to pressure, such as a liquid crystal film, is placed beneath a flexible display surface. One or more video cameras trained on the underside of the material capture the changes in optical properties that occur when a user touches the projection surface and therefore applies pressure to the thin layer. The location of contact is then determined through analysis of the video camera images. Alternatively, ultrasound may be used to detect contact information. Further, a combination of such schemes, e.g. IR and ultrasound, may be used to detect contact information.

Regardless of the approach used to determine contact locations on the display surface, the location information is analyzed to identify user gestures. In the preferred embodiment of the invention, the infrared emitters and receivers periodically provide location information to a computer software application. For each of M distinct contact locations, the software records over time the discrete sequence of positions $\vec{x}_i(n)$, where $i \in [1,M]$. To determine whether or not two contact locations are distinct from one another, the distance between the points of contact may be considered, with two points separated by a distance greater than a predetermined threshold distance $\epsilon_d$ considered distinct contact locations.

By considering a recent history of the contact positions, a discrete sequence of velocities $\vec{v}_i(n)$, including both a rate and direction of motion, is determined for each distinct contact. Most simply, $$\vec{v}_i(n) = \frac{1}{\Delta T}[\vec{x}_i(n) - \vec{x}_i(n-1)]$$

where $\Delta T$ is the interval at which the infrared emitters and receiver periodically provide location information. Preferably, to provide a smoothing effect and to mitigate the effects of noise in the contact location measurements, a longer history of position information is incorporated. For example, the expression $$\vec{v}_i(n) = \frac{1}{N\Delta T}[\vec{x}_i(n) - \vec{x}_i(n-N)]$$

may be used, where N is the number of time steps that are considered in the recent history. More sophisticated techniques may also be employed, such as a least squares curve fit to the recent history of contact positions.

The position and velocity information determined in this manner is used to identify gestures. The gestures are in turn associated with specific display commands, which are executed to update the display as desired by the user. In the preferred embodiment of the invention, gestures are both identified and associated with display control commands via a single procedure. Up to two distinct contact locations are tracked by the software. That is, M is constrained to be less than two at any one time interval n. If a third contact location is identified, it is ignored until one or both of the existing contact locations is released by the user. The one or two contact locations are associated with individual points within the displayed imagery, i.e. pixels. As the positions of the contact locations move, the display is updated such that the pixels within the image remain coincident with the contact locations. Thus, to the user, the displayed image appears and feels to be an elastic sheet of paper that can be translated, rotated, and stretched as desired.

Figure 4:
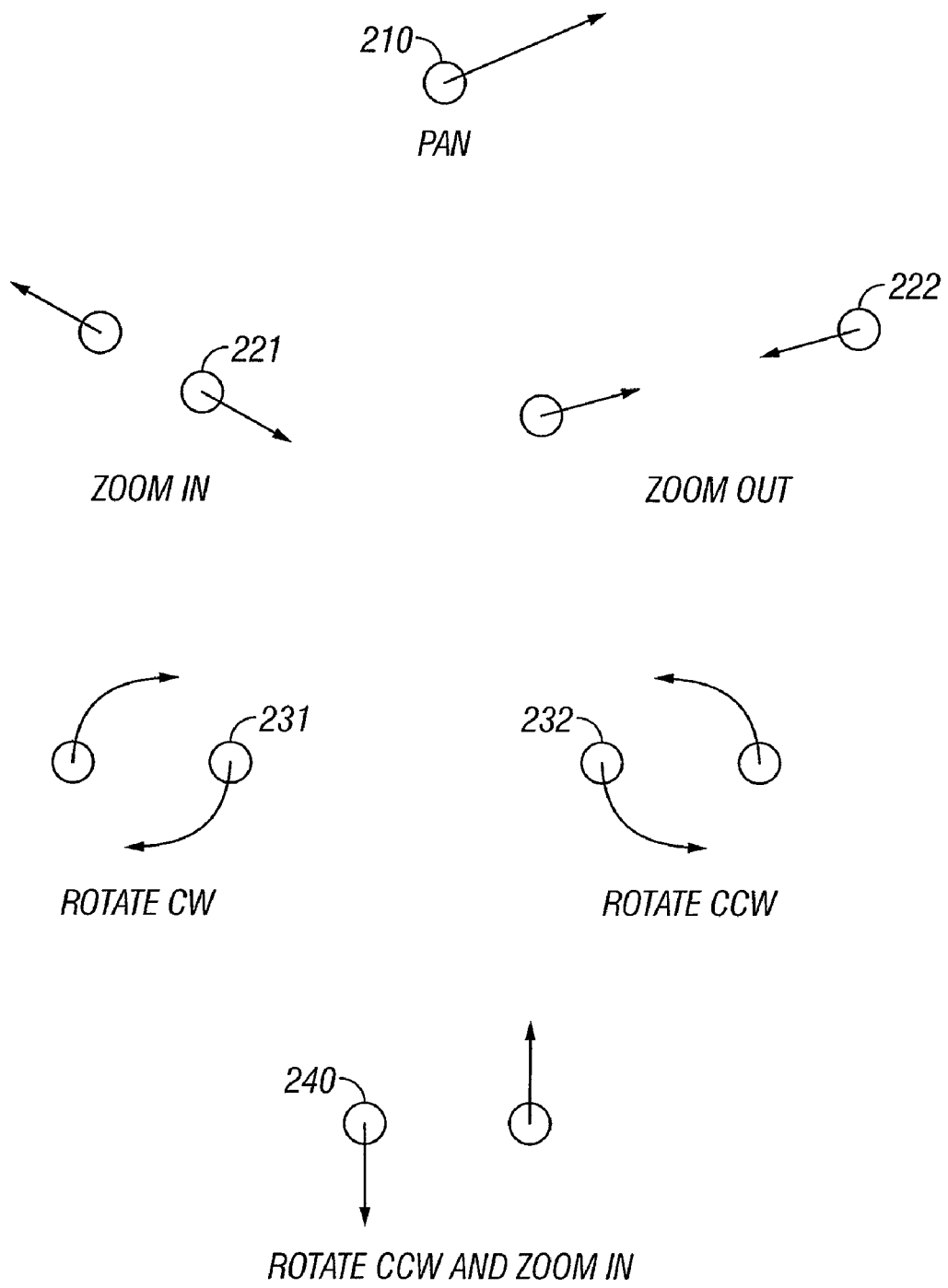
FIG. 4 shows a set of gestures and associated display control commands according to the preferred embodiment of the invention.

FIG. 4 shows a set of gestures and associated display control commands according to the preferred embodiment of the invention. If a user establishes and then moves a single contact location 210, the result is a panning movement, i.e. pure translation, of the imagery. The direction and rate of the pan is determined by the velocity of the contact location. If a user establishes two contact locations and initiates a separating motion 221, the results is a inward zoom of the imagery. Similarly, an approaching motion of the two contact locations results in an outward zoom 222. If a user establishes two contact locations and initiates a clockwise rotary motion 231 of the locations at a fixed radius about a center of rotation, the result is a clockwise rotation of the imagery about the center of rotation. The corresponding motion in a counterclockwise direction 232 results in a counterclockwise rotation. The foregoing provide presently preferred gestures. Those skilled in the art will appreciate that both additional gestures and/or different executions for such gestures may be chosen.

An important feature of this approach to identifying gestures and controlling the displayed imagery is that the basic motions described above can be combined to effect more complicated changes in the displayed imagery. For example, if a user establishes a right and a left contact location and initiates an offset separating motion, upward on the right and downward on the left 240, the result is a combined inward zoom and counterclockwise rotation.

In practice, inexperienced users of the interactive display may be overwhelmed by the power and flexibility of the above gestures and associated display control commands. For example, a user may be confused or disoriented when an imperfect attempt to zoom inward results in a combined inward zoom and a slight rotation. It may therefore be beneficial for the gesture identification procedure to classify gestures as one of several distinct, allowable gestures.

Figure 5:
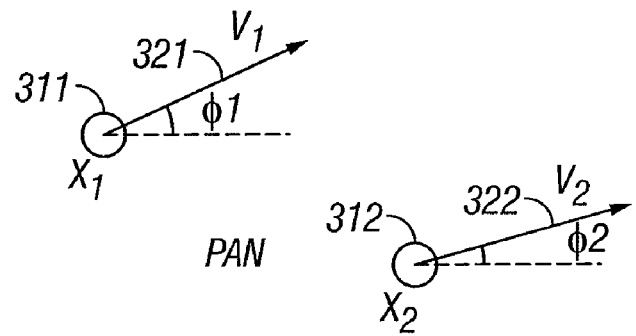
FIG. 5 shows a set of gestures and associated display control commands according to an alternative embodiment of the invention.
Figure 5:
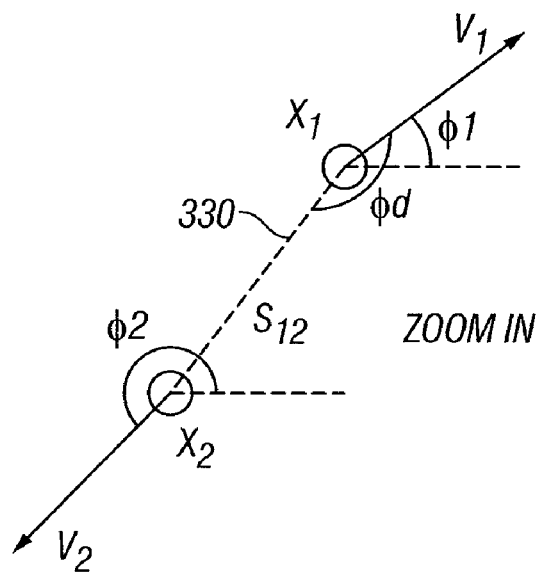
Figure 5:
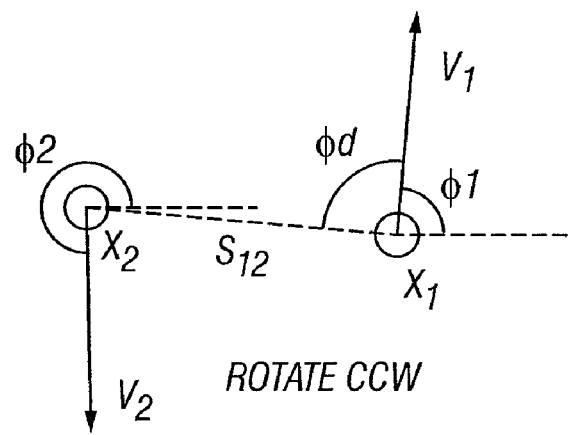

FIG. 5 shows a set of gestures and associated display control commands according to an alternative embodiment of the invention. In this approach to gesture identification, gestures that would result in a combined motion using the approach of FIG. 4 are classified as either a pure pan, zoom, or rotation. For example, consider an instance in which a user establishes and moves two contact locations characterized by positions $\vec{x}_1$ 311 and $\vec{x}_2$ 312. Velocities $\vec{v}_1$ 321 and $\vec{v}_2$ 322 are determined for each of the contact points, including magnitudes and directions $\phi_1$ and $\phi_2$. The directions are compared. If the directions are found to be similar, then the two contact points are treated as one. Specifically, if $$|\phi_1 - \phi_2| < \theta_c^p,$$

where $\theta_c^p$ is a predetermined tolerance, then either the first or second contact location and velocity is ignored, or the two contact locations and velocities are averaged. In either case, a single contact location and velocity is obtained, and the identified gesture is associated with a panning movement of the display.

As a further example, consider an instance in which a user establishes and moves two contact locations, as shown in the middle diagram of FIG. 5. Positions and velocities are determined as described above. In this instance, however, it is found that Equation 3 is not satisfied. In this case, the angle $\phi_d$ between the line segment $S_{12}$ 330 connecting the positions $\vec{x}_1$ and $\vec{x}_2$ and either of the two velocities is considered. In FIG. 5, the angle $\phi_2$ between $S_{12}$ and $\vec{v}_1$ is considered. If the line segment $S_{12}$ and the velocity are found to be in approximate alignment, then the gesture is identified as a request for a zoom of the display. That is, if $$|\pi - \phi_d| < \theta_c^z,$$

where $\theta_c^z$ is a predetermined tolerance, then the gestures is identified as a request for a zoom. To determine whether the display should be zoomed in or zoomed out, the length of the line segment $S_{12}$ is considered. If the length is decreasing, the gesture is identified as a request for an outward zoom. Correspondingly, if the length is increasing, as is shown in FIG. 5, the gesture is identified as a request for an inward zoom.

As yet another example, consider an instance in which a user establishes and moves two contact locations as shown in the lower diagram of FIG. 5. Again, Equation 3 is not satisfied. However, Equation 4 is also not satisfied. In this case, a check is performed to determine if one of the velocities is approximately perpendicular to the line segment $S_{12}$. If $$\left|\frac{\pi}{2} - \phi_d\right| < \theta_c^r,$$

where $\theta_c^r$ is a predetermined tolerance, then the gesture is identified as a request for a rotation of the display. The direction of the rotation may be determined by computing a cross product of one of the velocity vectors and a vector $\vec{s}_{12}$ connecting the two positions $\vec{x}_1$ and $\vec{x}_2$.

Finally, consider the instance in which none of Equations 3, 4, or 5 are satisfied. In this case, the gesture cannot be identified as a pure pan, zoom, or rotation. The gesture is therefore ignored, and the user may be alerted with an audible tone or visual cue that the gesture was not identified.

As noted above, if a gesture is identified, the display is updated accordingly. In each of the three cases, the rate at which the display is altered, e.g. panned, zoomed, or rotated, is proportional to the magnitude of the velocity of the contact points. Either one of the two velocities may be selected, or an average magnitude may be computed. A gain or attenuation may be applied to this velocity to provide the desired balance of speed and precision in display control.

The gesture based display control commands, such as those above, may be supplemented by other gestures and associated commands that extend the ability of users to interact intuitively with the information provided on the display. For example, if a user touches the display surface at a point corresponding to a displayed object for which properties are known, and the user maintains the contact for a period of time longer than a predetermined period of time $\tau_t$, the corresponding displayed object is selected. The user may then be presented with a series of operations that may be performed on the object. For example, a user selecting a city may be presented with options to list and update the census data associated with the city. Detailed information of this nature may be provided to the user directly on the display surface or via an auxiliary display located near the display surface.

The gesture based display control commands described above may be further supplemented by commands activated when a user touches specially defined regions within the display surface associated with a control interface presented within the imagery. A primary example is the use of menus, through which users may perform more complicated operations than can be described using simple gestures.

Figure 6:
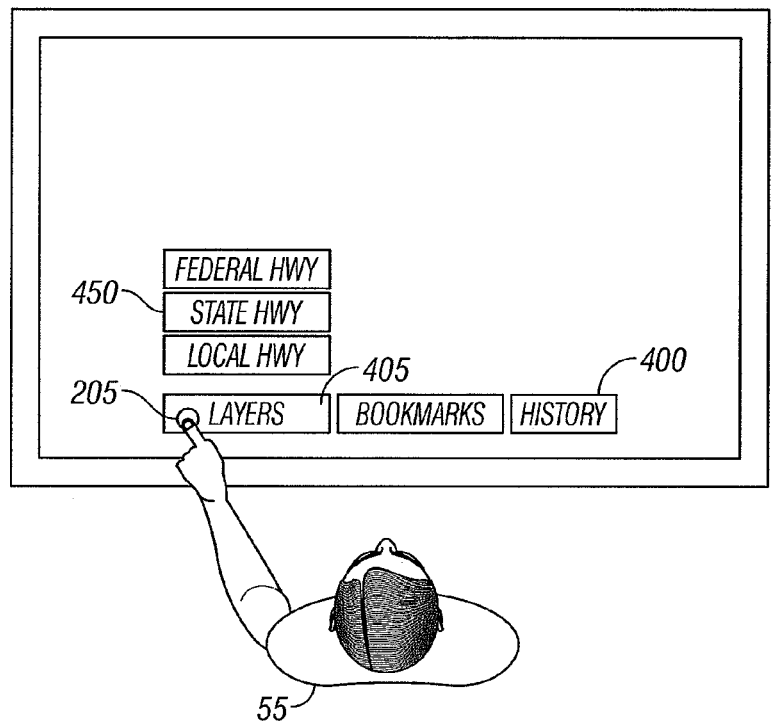
FIG. 6 shows an interactive, touch detecting display on which a user has activated a menu to reveal a submenu, according to the preferred embodiment of the invention.

FIG. 6 shows an interactive, touch detecting display on which a user has activated a menu to reveal a submenu, according to the preferred embodiment of the invention. A menu 400 containing several items is presented to the user. In the specific example of FIG. 6, the menu contains items providing access to functions related to imagery layers, bookmarks cataloguing previously display configurations stored at the request of the user, and a history of previous display configurations automatically stored by the system. By touching the display surface at a point 205 corresponding to one of the menu items, the corresponding menu item 405 is selected. If a single function or command is associated with the selected menu item, it is executed. In FIG. 6, a submenu 450 is displayed prompting the user 55 to select a more specific command. Specifically, the user is prompted to select which imagery layer or layers he would like to display. Selection within the submenu is accomplished in a similar manner.

Figure 7:
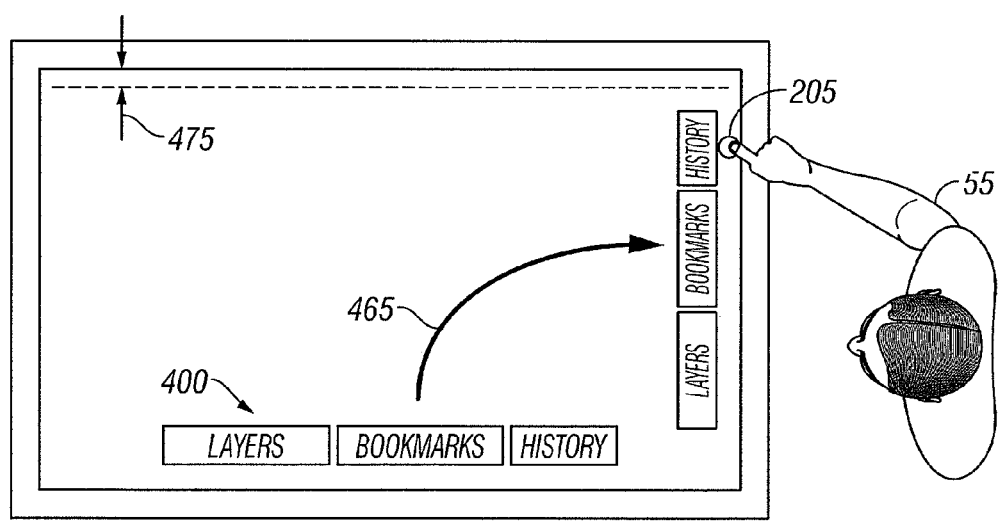
FIG. 7 shows an interactive, touch detecting display on which a user has moved and reoriented a menu according to the preferred embodiment of the invention.

FIG. 7 shows an interactive, touch detecting display on which a user has moved and reoriented a menu according to the preferred embodiment of the invention. The presence of the menu shown in FIG. 6 imparts an undesirable bias to the display, suggesting a preferred viewing position on the side of the display towards which the menu is oriented. To address this bias, and to facilitate the ease with which multiple users may investigate the displayed imagery, the orientation and location of the menus is adjustable. In FIG. 7, a user 55 towards which the menu 400 is not oriented touches the display surface at a point 205 near the periphery of the display surface. Because the point 205 of contact is within a predetermined distance $\epsilon_m$ 475 of the periphery of the display surface, the menu is moved and reoriented 465 to be more accessible to the user. This functionality provides an orientationless display that more naturally facilitates collaboration among multiple users.

Figure 8:
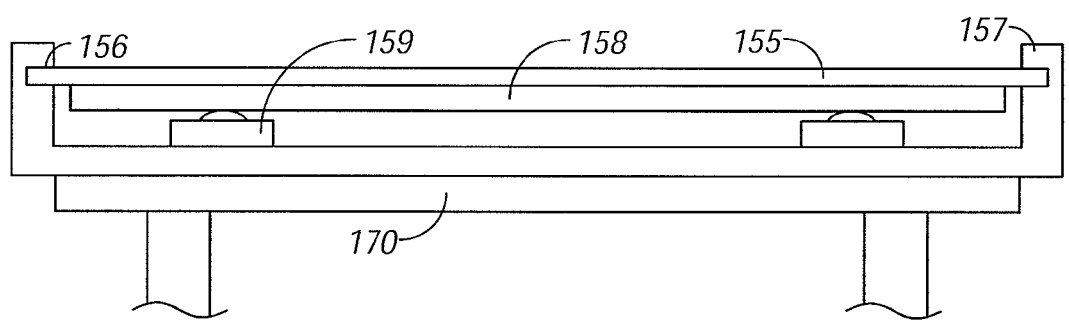
FIG. 8 shows a cross-sectional view of an interactive, touch detecting display incorporating load cells according to the invention.

FIG. 8 shows a cross-sectional view of an interactive, touch detecting display incorporating load cells according to the invention. In this and similar embodiments of the invention, it is possible to determine the intensity, i.e. the force, with which a user contacts the projection surface. For example, in FIG. 8, a flexible projection surface 155 is supported by a rigid subsurface plate 158. The edges of the flexible projection surface are secured by a gasket 156 clamped by a frame member 157. The frame member is supported by the table-like structure 170. Four load cells 159, each located beneath a corner of the rigid subsurface plate, are supported by the frame member and therefore the table-like structure. The subsurface plate is supported only by the load cells, and is therefore free to move relative to the frame member and table-like structure. Because the projection surface is flexible, any force imparted by a user as he touches the projection surface is transmitted through the projection surface and rigid subsurface plate to the load cells. By adding the loads measured by the four load cells, an intensity of the user contact with the projection surface can be determined. Once determined, the intensity of the contact can be used to supplement the identification of gestures described above. For example, when altering the visibility of image layers, touch intensity may be used to modify the transparency of a layer, with a low intensity contact denoting near full transparency, and a high intensity contact denoting full opacity. The intensity may also be used to determine the gain or attenuation applied to the velocity of the command executed by the identified gestures.

It should be noted that through a full static analysis of the loads measured by the load cells, considering both forces and moments perpendicular to the plane of the rigid subsurface plate, the location of user contact can also be determined. Thus, a system of load cells may be used as a supplement or alternative to the various touch detection mechanisms described above.

The particular configuration of load cells shown in FIG. 8 is only one of many possible configurations. Notably, the configuration of FIG. 8 is statically over-constrained with respect to motion normal to the plane of the rigid subsurface plate. Such a system may be advantageous in mitigating the effects of noise in the load cell measurements. However, a non-over-constrained configuration of load cells, i.e. three load cells, would greatly simplify the static analysis.

Although the invention is described herein with reference to several embodiments, including the preferred embodiment, one skilled in the art will readily appreciate that other applications may be substituted for those set forth herein without departing from the spirit and scope of the invention.

Accordingly, the invention should only be limited by the following claims.

The invention claimed is:

1. A computer implemented method performed in a system including a processor coupled to digital data storage and a display having a touch-sensitive display surface, the display surface including a material layer with at least one optical property that changes responsive to pressure applied to the material layer, the method comprising the tasks of:
   in the digital data storage, storing a record defining a collection of multiple user gestures, each gesture executable by touching the display, and further storing for each user gesture an assignment of one or more of multiple prescribed operations of modifying subject matter presented by the display;

the processor performing visual analysis of the material layer;

for each of one or more touches experienced by the display surface, the processor using input including at least the visual analysis to track a position history of the touch;

the processor identifying from the collection of user gestures at least one user gesture executed by the one or more touches, the identifying being performed based at least in part upon the position history of the one or more of the touches experienced by the display surface; and the processor identifying the one or more prescribed operations assigned to the executed user gesture, and causing the display to modify the subject matter presented by the display according to the identified one or more operations.

2. At least one non-transitory computer-readable storage medium containing a program of machine-readable instructions executable by a digital data processing machine to perform tasks for operating an interactive display system including a processor coupled to digital data storage and a display having a touch-sensitive display surface, the display surface including a material layer with at least one optical property that changes responsive to pressure applied to the material layer, where the digital data storage contains a record defining a collection of multiple user gestures, each user gesture executable by touching the display, and where the digital data storage further contains for each user gesture an assignment of one or more of multiple prescribed operations of modifying subject matter presented by the display, where the tasks comprise:

the processor performing visual analysis of the material layer;

for each of one or more touches experienced by the display surface, the processor using input including at least the visual analysis to track a position history of the touch;

the processor identifying from the collection of user gestures at least one user gesture executed by the one or more touches, the identifying being performed based at least in part upon the position history of the one or more of the touches experienced by the display surface; and the processor identifying the one or more prescribed operations assigned to the executed user gesture, and causing the display to modify the subject matter presented by the display according to the identified one or more operations.

3. A computer implemented method performed in a system including a processor coupled to digital data storage and a display having a touch-sensitive display surface, the method comprising the tasks of:

in the digital data storage, storing a record defining a collection of multiple user gestures, each user gesture executable by touching the display, and further storing for each user gesture an assignment of one or more of multiple prescribed operations of modifying subject matter presented by the display;

for each of one or more touches experienced by the display surface, the processor determining a force exerted by the touch upon the display surface;

based on one or more prescribed properties of the one or more touches experienced by the display surface, the processor identifying from the collection of user gestures at least one user gesture executed by the one or more touches;

the processor identifying the one or more prescribed operations assigned to the executed user gesture, and causing the display to modify the subject matter presented by the display according to the identified one or more operations; and where the tasks are further performed according to any or both of:
  (1) the identification of the executed user gesture is performed based on properties including the determined force of the one or more touches;
  (2) as to the manner in which the subject matter presented by the display is modified according to the identified one or more operations, said manner is further responsive to the determined force of the one or more touches.

4. At least one non-transitory computer-readable storage medium containing a program of machine-readable instructions executable by a digital data processing machine to perform tasks for operating an interactive display system including a processor coupled to digital data storage and a display having a touch-sensitive display surface, where the digital data storage contains a record defining a collection of one or more user gestures, each user gesture executable by touching the display, and where the digital data storage further contains for each user gesture an assignment of one or more prescribed operations of modifying subject matter presented by the display, where the tasks comprise:

for each of one or more touches experienced by the display surface, the processor determining a force exerted by the touch upon the display surface;

based on one or more prescribed properties of the one or more touches experienced by the display surface, the processor identifying from the collection of user gestures at least one user gesture executed by the one or more touches;

the processor identifying the one or more prescribed operations assigned to the executed user gesture, and causing the display to modify the subject matter presented by the display according to the identified one or more operations; and where the tasks are further performed according to any or both of:
  (1) the identification of the executed user gesture is performed based on properties including the determined force of the one or more touches;
  (2) as to the manner in which the subject matter presented by the display is modified according to the identified one or more operations, said manner is further responsive to the determined force of the one or more touches.

5. A computer implemented method performed in a system including a processor coupled to digital data storage and a display having a touch-sensitive display surface, the method comprising the tasks of:

in the digital data storage, storing a record defining a collection of one or more user gestures, each user gesture executable by touching the display, and further storing for each user gesture an assignment of one or more prescribed operations of modifying subject matter presented by the display;

the processor causing the display to present subject matter including a representation of at least one control interface or menu positioned proximate to and oriented towards a first location on a periphery of the display surface;

for each touch experienced by the display surface, the processor determining a position of the touch;

based on data including the determined position or a history of the determined position of one or more of the touches experienced by the display surface, the processor identifying from the collection of user gestures at least one user gesture executed by the one or more touches;

the processor identifying the one or more prescribed operations assigned to the executed user gesture, and causing the display to begin modifying the subject matter presented by the display according to the identified one or more operations;

where the at least one executed user gesture includes a first gesture, and the identified one or more prescribed operations includes a first operation assigned to the first gesture, and where the first operation causes the display to effect a movement and reorientation of the control interface or menu proximate to and oriented towards a second location on the periphery of the display surface, the second location being different than the first location.

6. At least one non-transitory computer-readable storage medium containing a program of machine-readable instructions executable by a digital data processing machine to perform tasks for operating an interactive display system including a processor coupled to digital data storage and a display having a touch-sensitive display surface, where the digital data storage contains a record defining a collection of multiple user gestures, each user gesture executable by touching the display, and where the digital data storage further contains for each user gesture an assignment of one or more of multiple prescribed operations of modifying subject matter presented by the display, where the tasks comprise:

the processor causing the display to present subject matter including a representation of at least one control interface or menu positioned proximate to and oriented towards a first location on a periphery of the display surface;

for each touch experienced by the display surface, the processor determining a position of the touch;

based on data including the determined position or a history of the determined position of one or more of the touches experienced by the display surface, the processor identifying from the collection of user gestures at least one user gesture executed by the one or more touches;

the processor identifying the one or more prescribed operations assigned to the executed user gesture, and causing the display to begin modifying the subject matter presented by the display according to the identified one or more operations;

where the at least one executed user gesture includes a first gesture, and the identified one or more prescribed operations includes a first operation assigned to the first gesture, and where the first operation causes the display to effect a movement and reorientation of the control interface or menu proximate to and oriented towards a second location on the periphery of the display surface, the second location being different than the first location.

7. The invention of claim 3 or 4, where:
the processor establishes a velocity at which the subject matter presented by the display is modified in response to the sensed force.

8. The invention of claim 3 or 4, where:
subject matter presented by the display includes a combined representation of multiple layers of imagery; and
one of the prescribed operations comprises modifying transparency of one or more but less than all of the imagery layers responsive to the determined force.

9. The invention of claim 3 or 4, where the force is determined using measurements obtained by load cells mechanically coupled to the display surface.

10. The invention of claim 1 or 2 or 3 or 4 or 5 or 6, wherein the subject matter presented by the display includes geographic information systems imagery.

11. The invention of claim 1 or 2 or 3 or 4 or 5 or 6, wherein the display surface is a projection surface, and the subject matter is produced by a projector.

12. The invention of claim 1 or 2 or 3 or 4, wherein the multiple prescribed operations include any of:
a panning movement;
a zoom; and
a rotation.

13. The invention of claim 1 or 2 or 3 or 4 or 5 or 6, the tasks further comprising detecting touches experienced by the display surface by performing any of:
operating at least one infrared emitter and receiver pair;
operating a capacitive touch pad;
operating an ultrasound system;
operating a resistive touch pad.

14. The invention of claim 5 or 6, where the first gesture comprises occurrence of a touch upon the display surface within a prescribed proximity to the second location.

15. The invention of claim 5 or 6, where the periphery of the display surface includes multiple edges, and the first location comprises a first one of the edges, and the second location comprises a second one of the edges different than the first edge, and where the first gesture comprises occurrence of a touch within a prescribed distance of the second edge.

* * * * *